United States Patent [19]
Cheiky

[11] Patent Number: 5,387,477
[45] Date of Patent: Feb. 7, 1995

[54] AIR MANAGER SYSTEM FOR METAL-AIR BATTERY

[75] Inventor: Michael C. Cheiky, Santa Barbara, Calif.

[73] Assignee: Dreisbach Electromotive Inc., Santa Barbara, Calif.

[21] Appl. No.: 83,204

[22] Filed: Jun. 25, 1993

Related U.S. Application Data

[63] Continuation of Ser. No. 916,360, Jul. 17, 1992, abandoned.

[51] Int. Cl.$^6$ .............................................. H01M 8/04
[52] U.S. Cl. ......................................... 429/26; 429/27; 429/34
[58] Field of Search ..................... 429/26, 27, 13, 34

[56] References Cited

U.S. PATENT DOCUMENTS

| | | |
|---|---|---|
| 684,700 | 10/1901 | Lloyd . |
| 737,613 | 9/1890 | Halsey . |
| 1,112,861 | 10/1914 | Snyder . |
| 1,285,659 | 11/1918 | Ford . |
| 1,363,889 | 12/1920 | Linebanger . |
| 2,273,244 | 4/1940 | Ambruster . |
| 2,275,281 | 1/1938 | Berl . |
| 2,468,430 | 1/1949 | Derksen . |
| 2,759,038 | 8/1956 | Marsal . |
| 3,160,528 | 12/1964 | Dengler . |
| 3,288,644 | 11/1966 | Delfino . |
| 3,395,047 | 7/1968 | Terry et al. . |
| 3,411,951 | 11/1968 | Gelting . |
| 3,473,963 | 10/1969 | Sanderson . |
| 3,523,830 | 8/1970 | Baker et al. . |
| 3,615,839 | 10/1971 | Thompson . |
| 3,871,920 | 3/1975 | Grebier et al. . |
| 4,177,327 | 12/1979 | Matthews et al. . |
| 4,221,644 | 9/1980 | La Barre . |
| 4,246,324 | 1/1981 | de Nora et al. . |
| 4,279,970 | 7/1981 | Breault et al. . |
| 4,364,805 | 12/1982 | Rogers . |
| 4,448,858 | 5/1984 | Graf et al. . |
| 4,490,443 | 12/1984 | Ruch et al. . |
| 4,508,793 | 4/1985 | Kumata et al. .................. 429/26 |
| 4,521,497 | 6/1985 | Tamminen . |
| 4,588,660 | 5/1986 | Shimizu et al. . |
| 4,588,661 | 5/1986 | Kaufman et al. . |
| 4,599,282 | 7/1986 | Hirota et al. .................... 429/26 |
| 4,678,724 | 7/1987 | Mc Elroy ....................... 429/34 |
| 4,693,946 | 9/1987 | Niksa et al. ................... 429/27 |
| 4,729,930 | 3/1988 | Beal et al. . |
| 4,756,980 | 7/1988 | Niksa et al. . |
| 4,828,939 | 5/1989 | Turley et al. . |
| 4,842,963 | 6/1989 | Ross, Jr. . |
| 4,894,295 | 1/1990 | Cheiky ......................... 429/27 |
| 4,913,983 | 4/1990 | Cheiky ......................... 429/13 |
| 4,925,744 | 5/1990 | Niksa et al. ................... 429/27 |
| 4,927,717 | 5/1990 | Turley et al. . |

FOREIGN PATENT DOCUMENTS

| | | |
|---|---|---|
| 2353142 | 1/1978 | France . |
| 3239396 | 4/1984 | Germany . |
| 48-27096 | 8/1973 | Japan . |
| 50-40773 | 12/1975 | Japan . |
| 59-134570 | 8/1984 | Japan . |
| 1176488 | 12/1966 | United Kingdom . |
| 9319495 | 7/1993 | WIPO . |

OTHER PUBLICATIONS

Gregory, Metal-Air Batteries, 1972, pp. 33-39, 48-51, 77-79 (month not available).

Collins, Power Sources 2: Research and Development In Non-Mechanical Power Sources, 1968, pp. 423, 429-434, 438-439 (month not available).

*Primary Examiner*—Anthony Skapars
*Attorney, Agent, or Firm*—Renner, Otto, Boisselle & Sklar

[57] ABSTRACT

An air manager system for a metal-air battery cell having an air cathode, the air manager system producing a flow of air through the air manager system and battery cell and directing a first air flow adjacent to the air cathode to provide reactant air and directing a second air flow adjacent to a portion of the battery cell isolated from the air cathode to provide cooling of the battery cell, preferably near the anode. The air manager system may be used with multiple cell metal-air battery packs. Heat exchange between the isolated air flows may be facilitated, and the reactant air may be recirculated for uniform cooling.

19 Claims, 6 Drawing Sheets

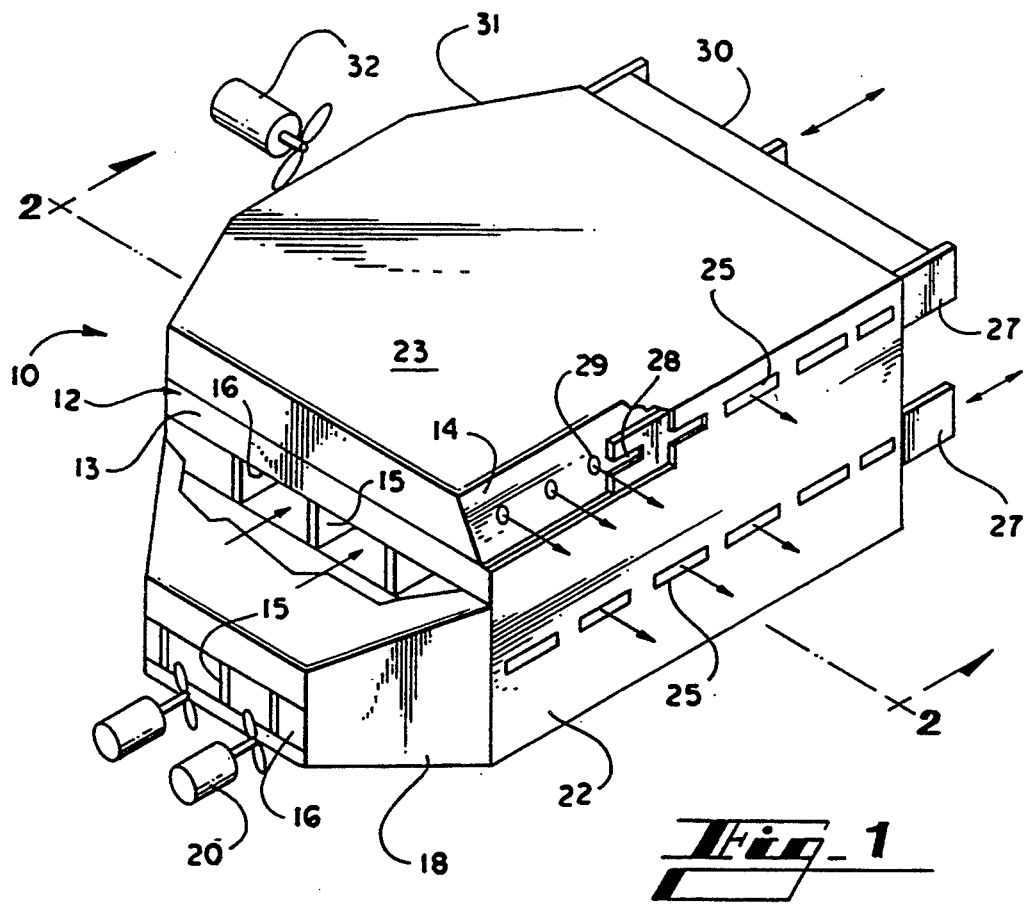
Fig_1
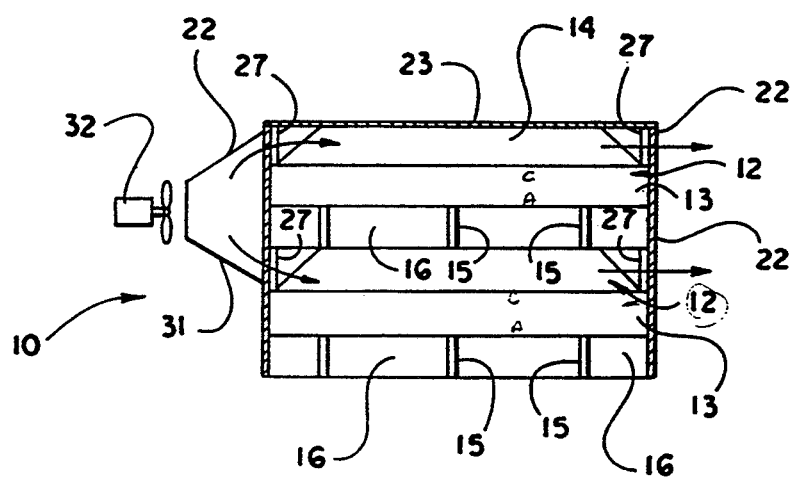
Fig_2

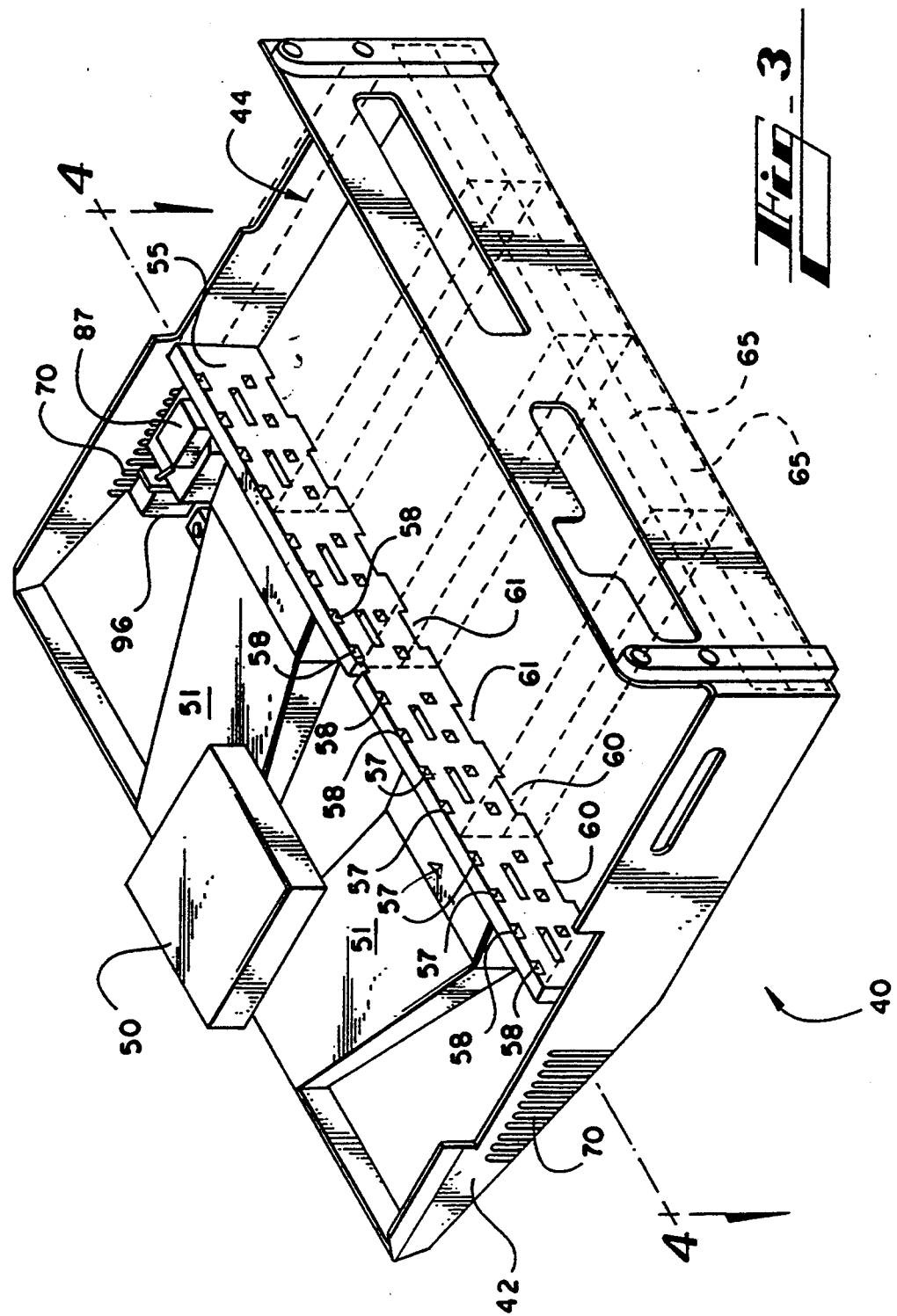

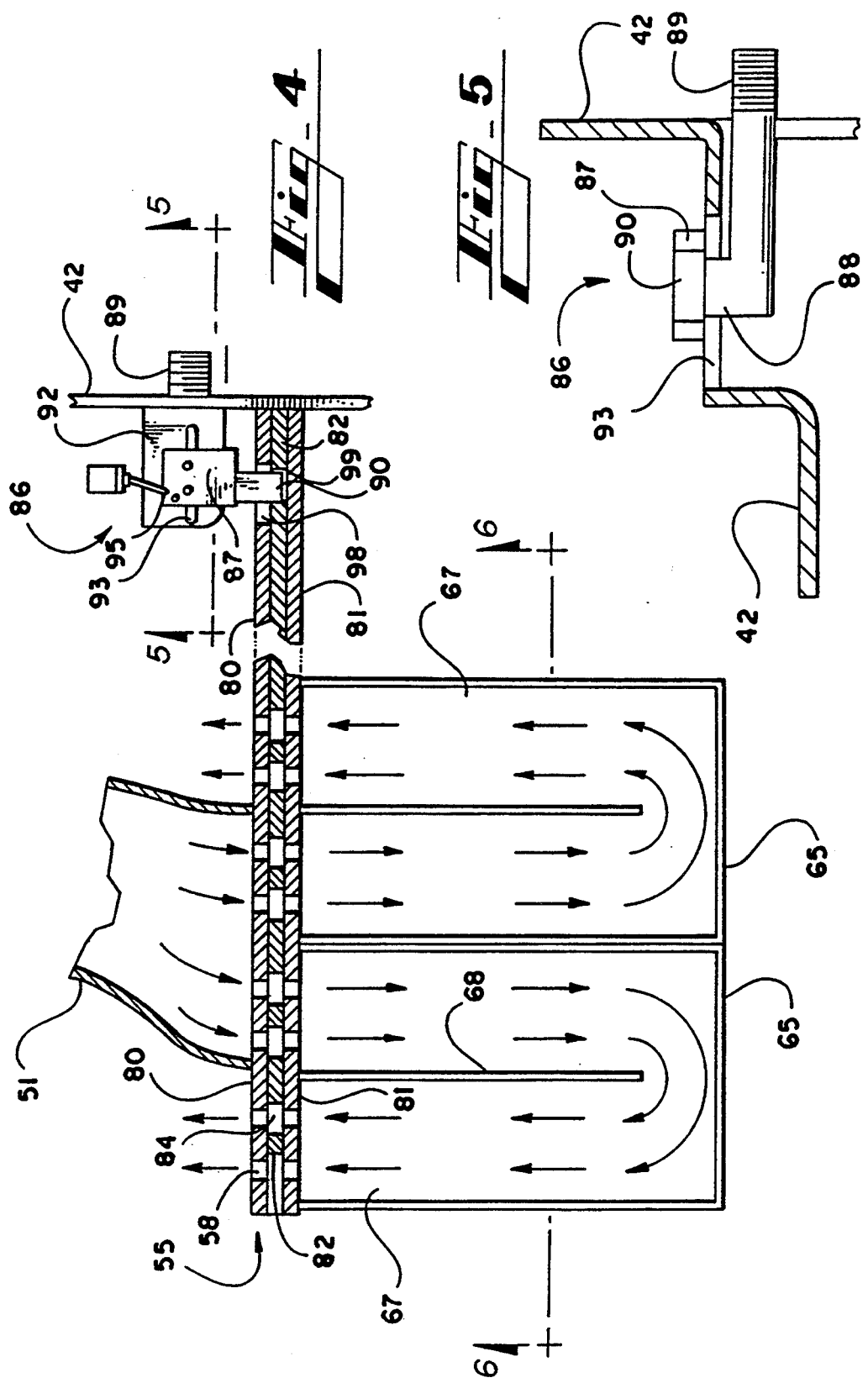

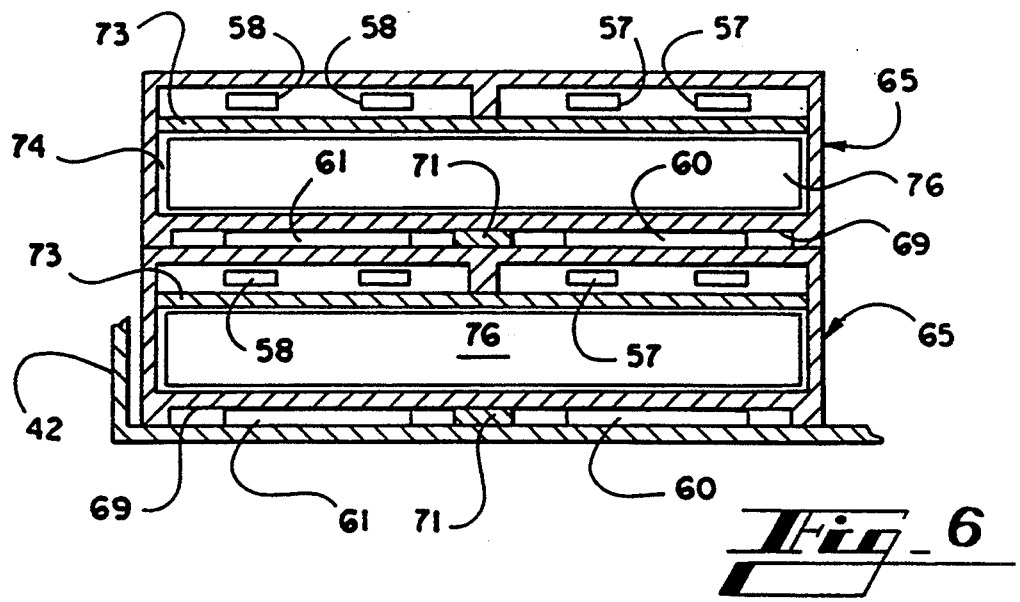
Fig_6
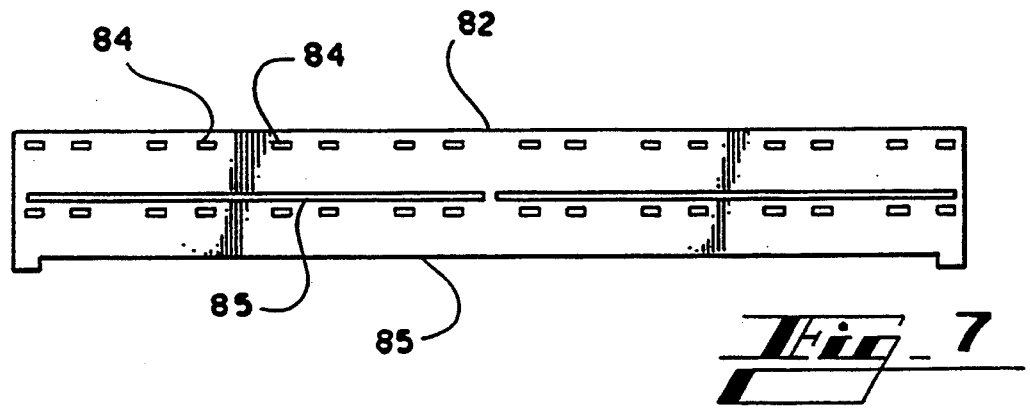
Fig_7
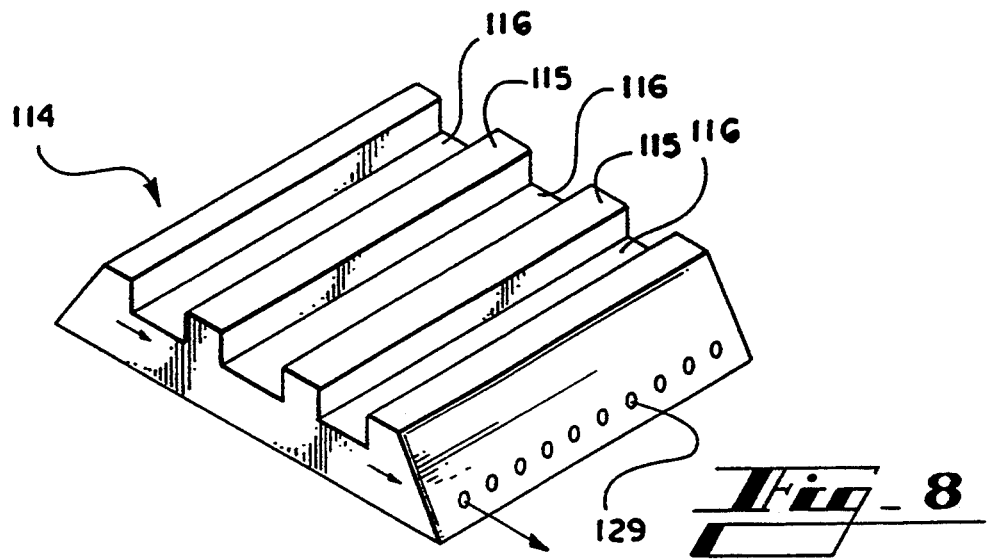
Fig_8

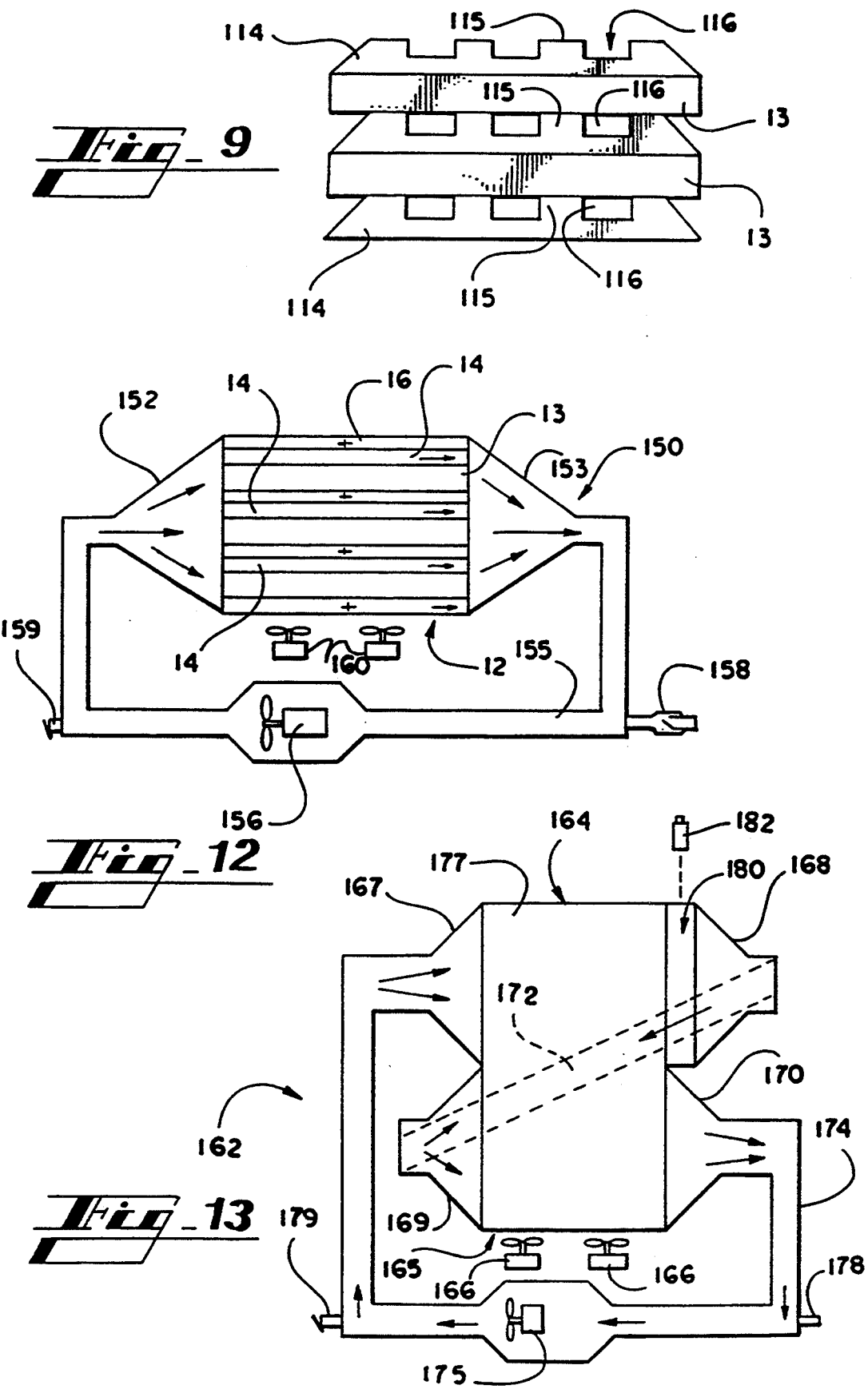

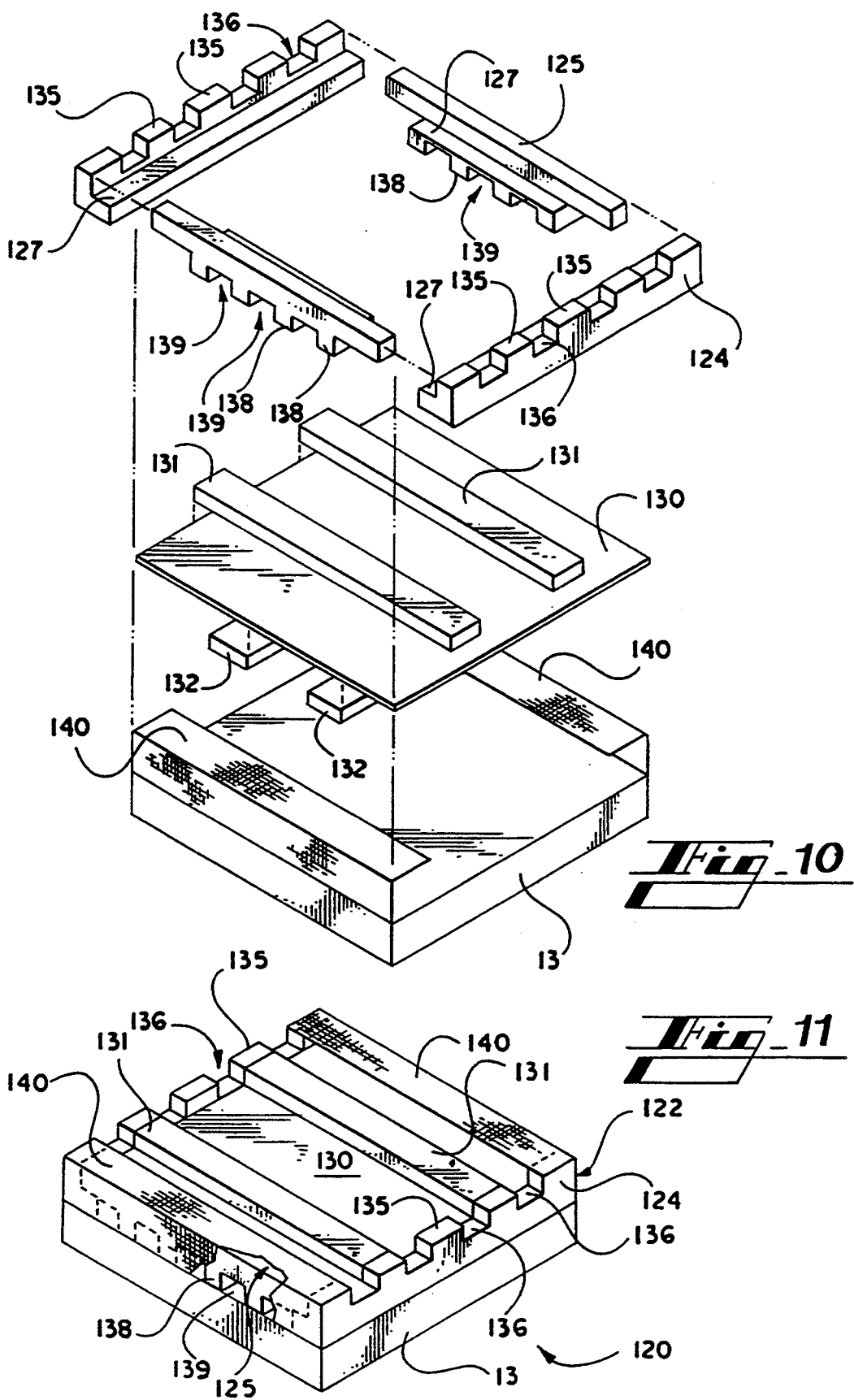

AIR MANAGER SYSTEM FOR METAL-AIR BATTERY

This is a continuation of application Ser. No. 916,360, filed Jul. 17, 1992, now abandoned.

TECHNICAL FIELD

The present invention relates generally to batteries, and more particularly relates to a system for controlling air flow to a metal-air battery.

BACKGROUND OF THE INVENTION

Metal-air batteries include an air permeable cathode and a metallic anode separated by an aqueous electrolyte. For example, in a zinc-air battery, the anode contains zinc, and during operation, oxygen from the ambient air is converted at the cathode to hydroxide, zinc is oxidized at the anode by the hydroxide, and water and electrons are released to provide electrical energy. Metal-air batteries have a relatively high energy density because the cathode of a metal-air battery utilizes oxygen from ambient air as a reactant in the electrochemical reaction rather than a heavier material such as a metal or metallic composition. This results in a relatively lightweight battery.

Both primary and secondary metal-air batteries have been developed. A rechargeable metal-air battery is recharged by applying voltage between the anode and cathode of the metal-air battery cell and reversing the electrochemical reaction. Oxygen is discharged to the atmosphere through the air permeable cathode.

Metal-air battery cells are often arranged in multiple cell battery packs to provide a sufficient amount of power output. In addition, it is often necessary to expose the air cathodes of the cells to a continuous flow of air at a flow rate sufficient to achieve the desired power output. Such an arrangement is shown in Cheiky U.S. Pat. No. 4,913,983 wherein a fan is used to supply a flow of air to a pack of metal-air battery cells.

One problem with metal-air batteries is that the ambient humidity can cause the metal-air battery to fail. Equilibrium vapor pressure of the metal-air battery results in an equilibrium relative humidity that is typically about 40 percent. If ambient humidity is greater than the equilibrium relative humidity value for the metal-air battery, the metal-air battery will absorb water from the air through the cathode and fail due to a condition called flooding. Flooding may cause the battery to burst. If the ambient humidity is less than the equilibrium relative humidity value for the metal-air battery, the metal-air battery will release water vapor from the electrolyte through the air cathode and fail due to drying out. In most environments where a metal-air battery is used, failure occurs from drying out.

In electrochemical cells and in oxygen depolarized cells in particular, heat is generated at the cathode, anode, and electrolyte as ohmic losses and electrode polarization potential on both charge and discharge. In high power batteries, this waste heat can, at the extreme, cause the water component of the electrolyte to boil and can initiate rapid decomposition of battery components such as separators.

The problem is especially acute in oxygen depolarized cells in that the oxygen diffusion electrode(cathode) typically passes water vapor as freely as oxygen due to the similar size and polarization of diatomic oxygen and gaseous water molecules. Thus, as air is supplied to such batteries on discharge, or vented on recharge (in the case of rechargeable batteries), water vapor freely passes through the cathode as well. If the battery electrolyte temperature rises above ambient, then the water vapor pressure at the internal surface of the gas diffusion electrode will exceed the ambient water vapor pressure, and the cell will lose water to the environment by evaporation. This can be made up by water addition to the cell but, in many applications, freedom from maintenance or low maintenance is a requirement so minimizing water loss due to cell internal heating is of critical importance.

The traditional geometry for high power metal-air batteries and fuel cells made of multiple cells is to place the anode structure between two cathodes in each cell as per Katsouis et. al. U.S. Pat. No. 3,518,123, Chodosh U.S. Pat. No. 3,960,600 and Turley et. al. U.S. Pat. No. 4,927,717 in metal-air batteries, and Truitt U.S. Pat. No. 3,458,357, Joy U.S. Pat. No. 4,560,626 and Shimizu et. al. U.S. Pat. No. 4,562,123 in fuel cells. When cells of this construction are stacked as per Petix U.S. Pat. No. 3,682,705, Sauer et. al. U.S. Pat. No. 4,115,626, Niksa et. al. U.S. Pat. No. 4,693,946 and others, the air chambers between adjacent cells serve both to provide reaction oxygen and to provide cell cooling by heat conduction to the air stream and evaporative cooling due to water vapor diffusion from the battery cell or fuel cell cathodes.

Another attempt to deal with heat generation, by increasing the air flow rate over the air cathode to cool the metal-air battery, is disclosed in Terry et. al. U.S. Pat. No. 3,395,047. However, the increase in the air flow rate over the air cathode increases the rate of vaporization of the water and offsets the decrease in water loss from the cooling effect.

Cheiky U.S. Pat. No. 4,894,295 presents a cell with only one cathode in which an integral cathode air chamber and support provide air ducting to the cathode. The anode is a separate surface typically comprising a metal current collector and plastic outer shell. Such cells are typically operated in an air manager as per Cheiky U.S. Pat. No. 4,913,983 in which the air supply is regulated in response to the power demand. At power levels producing above 20 ma per square inch of anode, the internal temperature rise of such cells can cause sufficient water transport from the electrolyte into the cathode air stream to adversely affect battery operating life.

Another problem with a metal-air battery is that contaminants in the air such as carbon dioxide, cigarette smoke, and sulfides decrease the battery output. For example, carbon dioxide reacts with the metal hydroxide formed by the reaction between the anode and electrolyte. The reaction between carbon dioxide and the metal hydroxide forms a metal carbonate compound that interferes with the electrochemical reaction. The exposure of metal-air battery cells to contaminants is increased if the air flow rate over the cathodes is increased for cooling.

Drying out and flooding are even greater problems for secondary metal-air batteries than for primary metal-air batteries. Although ambient humidity may not be sufficient to flood or dry out a battery after a single cycle, cumulative water gain or loss from a series of discharge and charge cycles can cause premature failure of a secondary metal-air battery,.

Accordingly, there is a need for an air manager system for a metal-air battery that minimizes the effects of ambient humidity, heat generation and contaminants on the useable life of the battery.

SUMMARY OF THE INVENTION

The present invention is an air manager system for a metal-air battery that provides air cooling to reduce the water loss to the cathode air stream, while preserving a separate cathode air flow to satisfy the power requirement of the battery. Generally described, the air manager system of the present invention directs a first air flow adjacent to the portion of the battery cell containing the air cathode to provide reactant air, and directs a second air flow adjacent to a portion of the battery cell isolated from the air cathode to provide cooling of the battery cell. The second air flow preferably passes adjacent to a portion of the cell containing the anode. By isolating the cooling air from the reactant air, the temperature of the battery cell can be kept low without exposing the cathode to an excessive air flow rate. This reduces the likelihood of drying out the battery cell and reduces the exposure of the battery cell to contaminants.

The cathode air supply and cooling air supply can be provided by two fans or by one fan with the output of the fan divided into the first and second flows. A small quantity of air, typically 10% or less of the total of both flows, is directed to cathode air chambers to provide reactant air. The air supply to the cathodes must be off when the cell is not connected to a load and typically during recharge. However, a flow of air is still required to cool the cells during recharging. Thus, an air door may be provided to allow direction of the second flow to cooling channels with the cathode chambers sealed off.

Cells may be stacked in a battery pack with the air cathode of one cell facing the anode-containing portion of another cell. Mechanical spacers may be provided between the cells to allow the cooling air flow to pass over the anode assembly. Such spacers can be separate structures between cells. Or, they can be molded into the cell case adjacent to the anode, or over the cathode air chamber, which is maintained in isolation from cooling channels formed by the spacers. Heat transfer from the cell anodes to the cooling channels can be enhanced by using an anode case made of metal or a highly heat conductive plastic.

In addition to cooling the anode area of the cell, heat removal from the cathode air stream becomes important if the cells have a large surface area or utilize a recirculating cathode air flow (as described below). In either case, an integral heat exchange function between the cathode air and anode cooling air is accomplished by using a very thin wall between the cathode air chambers and the anode cooling channels, particularly one made of a heat conducting plastic or metal such as copper, nickel, monel, or the like.

In high power applications producing above 50 ma per square inch of cathode, uniformity of air flow over the cathode can become a problem such that it is desirable to circulate air over the cathode at many times the flow rate required by the average oxygen demand of the battery. In practice, the recirculated air will rapidly rise in temperature at the power levels at which it is needed. A heat exchanger therefore is provided, either external to the battery, or via the close proximity of the anode cooling air and the recirculating cathode air within the battery stack. The cathode air circulation can be cross coupled to even out the temperature of the cathode air. Furthermore, the hot section of the cathode recirculation duct can be used to provide humidification to the system to make up for the ongoing water loss via the cathode air exhaust.

Air cooling can be controlled in response to a thermal sensor to facilitate warm up in cold weather before cooling starts. The air cooling function should be independent of the cathode air supply function to facilitate cooling during recharging in instances where cathode air circulation is not required, such as when recharging is done at low rates which allow the evolved oxygen to diffuse out of the air manager unassisted.

In one preferred embodiment of the present invention, a source of air under pressure is delivered through at least one reactant air inlet in a barrier into a plenum defined above the air cathode in the cell case of a metal-air battery. The reactant air inlet is sized to control the amount of reactant air delivered to the plenum above the air cathode. Another portion of the same air under pressure is delivered through at least one cooling air inlet into contact with portions of the cell case in need of cooling, such portions of the case being isolated from the air cathode plenum.

In this embodiment, the air cathode plenum is U-shaped in the plane of the air cathode, as shown in U.S. Pat. No. 4,894,295, which is incorporated herein by reference in its entirety. The reactant air inlet then is positioned to communicate only with one leg of the U-shaped air plenum so that the reactant air travels from one end of the cell in a U-shaped path, and exits the plenum at the same end of the cell. Openings are provided in the barrier to allow escape of the reactant air. Similarly, a U-shaped path may be provided in a recessed bottom portion of the cell case of the type shown in U.S. Pat. No. 4,894,295 by adhering or defining a central divider in the recessed bottom so that a U-shaped cooling channel is formed when the cell case is placed on the floor of a battery compartment or on top of another cell case in a stack. Again, exhaust openings are provided in the barrier to allow escape of the cooling air.

In this embodiment of the present invention, means are provided for selectively blocking or opening the above-described passageways in the barrier which defines the air inlets and exhaust openings. Such means may preferably be a sliding baffle with complementary passageways so that in one position the passageways are aligned permitting passage of air, while in a laterally displaced position, the baffle blocks all the barrier passageways. The baffle is preferably operated by the power switch of the associated portable electronic device.

Thus, it is an object of the present invention to provide an improved apparatus and method for managing reactant and cooling air for a metal-air battery.

It is a further object of the present invention to provide an air manager for a metal-air battery capable of efficiently cooling the battery.

It is a further object of the present invention to provide an air manager for a metal-air battery cell capable of reducing flooding and drying out problems while permitting efficient operation of the air cathode.

It is a further object of the present invention to provide an air manager for a metal-air battery cell capable of facilitating cold starts of the cell while preventing overheating during normal operation.

It is a further object of the present invention to provide an air manager for a metal-air battery cell capable of controlling the humidity of and removing heat from the reactant air passed over an air cathode.

Other objects, features and advantages of the present invention will become apparent upon reviewing the following description of a preferred embodiment, when taken in conjunction with the drawing.

BRIEF DESCRIPTION OF THE DRAWING

FIG. 1 is a pictorial view of a power supply including a battery compartment and an air manager system according to the present invention.

FIG. 2 is a side cross sectional view taken along line 2—2 of FIG. 1.

FIG. 3 is a pictorial view of another embodiment of an air manager system embodying the present invention.

FIG. 4 is a top horizontal cross sectional view of a portion of the air manager system of FIG. 3, taken along line 4—4 of FIG. 3, showing the relationship between the barrier of the air manager system and the reactant air plenum of a metal-air cell.

FIG. 5 is a vertical cross sectional view of the switch mechanism taken along line 5—5 of FIG. 4.

FIG. 6 is a vertical cross sectional view of two stacked metal-air cells taken along line 6—6 of FIG. 4.

FIG. 7 is a plan view of a baffle forming pan of a barrier of the air manager system of FIG. 1.

FIG. 8 is a pictorial view of a cathode air duct into the top of which are molded spacers forming cooling air channels.

FIG. 9 is a side view of a stack of metal-air cells utilizing air duct moldings of the type shown in FIG. 8.

FIG. 10 is an exploded view of a metal-air cell including a removable air control and heat exchange assembly.

FIG. 11 is a pictorial view of the cell of FIG. 10 in assembled form.

FIG. 12 is a diagrammatic side view of a reactant air recirculation system for a battery including a stack of metal-air cells.

FIG. 13 is a diagrammatic top view of a reactant air recirculation system for a battery with two stacks of metal-air cells, and including a cross mixing duct.

DETAILED DESCRIPTION

Referring now in more detail to the drawing, FIG. 1 shows a power supply 10 including an air manager system embodying the present invention. As best shown in FIG. 2, two metal-air cells 12 are stacked one above the other. Each cell 12 consists of a cell body 13, which includes an air cathode (not shown) along the top surface of the cell body, an anode (not shown) in the bottom area of the cell body, and a cathode air duct 14 which provides an air chamber or plenum above the air cathode.

A plurality of spacers 15 extend across the stack under the cell bodies 13, forming cooling air channels 16. The spacers 15 under the cells 12 direct cooling air adjacent to the portion of the cell containing the anode. The spacers can be separate members, in which case the lowermost cell is raised on a set of spacers and another set is positioned between the cells. As described in more detail below, the spacers alternately can be formed as part of the cathode duct or the bottom of the cell body case.

A cooling air plenum 18 is attached to the side of the power supply 10 and extends to cover the cooling air channels 16. One or more cooling air fans 20 are positioned at the opening of the plenum 18, which directs air from the fans 20 into and through the channels 16. The cooling air exits the channels 16 at the other end (not shown) of the cell bodies and is exhausted from the system.

The stack of cells 12 is enclosed by a housing including a pair of side panels 22 and a top panel 23. The side panels 22 define a plurality of vent openings 25 spaced apart from one another in rows at the levels of the cathode air ducts 14. Thus, in the two-cell stack shown, there are four rows of openings 25, two in each side panel 22. An air door or baffle 27 is slidably positioned between each row of openings 25 and the adjacent cathode air duct 14. Openings 28 in the air doors 27 align with the openings 25 of the side panel when it is desired to allow air to flow through the air ducts 14. The air doors 27 are moved to a position in which the solid portions of the air doors block the openings 25 to prevent flow at appropriate times, such as when no load is applied to the battery.

FIG. 3 shows another embodiment of an air manager system 40 embodying the present invention, mounted in a lower housing 42 of an electronic device such as a laptop computer (not shown). At one end of the housing 42 is a battery compartment 44, shown empty in FIG. 3. At the end of the housing 42 opposite the compartment 44 a fan 50 is positioned to draw in outside air and force it through both arms of a U-shaped duct 51. The fan in the embodiment shown has a capacity of about 4 cubic feet per minute. The arms of the duct 51 terminate at a barrier 55 which divides the housing 42 and defines one side of the battery compartment 44. The barrier 5, about 12 inches by 1 and ¼ inches in the embodiment shown, defines four types of openings therethrough: reactant air inlets 57, reactant air exhaust openings 58, cooling air inlets 60, and cooling air exhaust openings 61. The passageways are arranged in four rows. A top row includes eight pairs of small openings consisting, from left to right in FIG. 3, of a pair of reactant air exhaust openings 58, two pairs of reactant air inlets 57, two pairs of reactant air exhaust openings 58, two pairs of reactant air inlets 57, and a pair of reactant air exhaust openings 58. A second row below the first row consists of a cooling air exhaust opening 61, two cooling air inlets 60, two cooling air exhaust openings 61, two cooling air inlets 60, and a cooling air exhaust opening 61.

As shown in the drawing, the cooling air openings 60 and 61 are substantially larger than the reactant air openings 57 and 58. The reactant air openings 57 and 58 may preferably be about 3/16 inch by ⅛ inch in size, and the cooling air openings 60 and 61 may preferably be about ⅜ inch by ¼ inch. It will be understood that the size of these openings can be varied according to the nature of the cells used, in order to provide an acceptable flow of reactant air and an amount of cooling air sufficient to maintain the temperature of the cells below a selected maximum temperature.

The third and fourth rows of passageways duplicate the first and second rows, respectively. Each arm of the duct 51 meets the barrier 55 to supply air under pressure through one of the two groups of vertically aligned inlet openings 57 and 60, leaving a group of exhaust openings between the arms of the duct, and smaller groups of exhaust openings between the arms of the duct and the side walls of the housing 42.

As shown in FIGS. 4 and 6, the air passageways in the barrier 55 are positioned to direct air in a particular manner to and from eight metal-air cells 65 in the battery compartment 44, positioned against the barrier 55. The cells 65 in the embodiment shown are each approximately ⅝ inch high by 3 inches wide by 5 and ¾ inches long, and are stacked two deep in the compartment 44. Each cell 65 defines a reactant air plenum 67 above an air cathode 73. The plenum 67, about ⅛ inch high, is open to the barrier 55 at one end of the cell, and includes a rib 68 extending along the center of the plenum from the barrier 55 to a position spaced from the opposite end of the plenum. Thus, the plenum 67 forms a U-shaped channel for passage of air over the air cathode 73. The rib 68 meets the barrier 55 between a pair of reactant air inlets 57 and a pair of reactant air exhaust openings 58, so that air blown by the fan 50 moves from the duct 51 through two of the inlets 57, passes the length of the plenum 67 on one side of the rib 68, passes in the opposite direction along the other side of the rib 68, and exits through two of the exhaust openings 58. The exhausted air may be vented to atmosphere through vents 40 formed in the housing 42.

Each cell 65 also defines a recessed bottom panel 69 which provides a cooling channel for cooling air. The recessed bottom is open to the barrier 55 at one end of the cell, and includes a divider 71 extending along the center of the recess from the barrier to a position spaced from the opposite end of the plenum. A U-shaped cooling channel is thus formed beneath the cell 65 between the recessed bottom 69 and either the floor of the housing 42 or the top of another cell 65 on which the cell is stacked, as shown in FIG. 6. Heat transfer from the cell anodes to the cooling channels can be enhanced by using a metal anode case instead of plastic. The divider 71 meets the barrier 55 between a pair of cooling air inlets 60 and a pair of cooling air exhaust openings 61, so that air blown by the fan 50 moves from the duct 51 through inlets 60, passes the length of the recessed bottom 69 on one side of the divider 71, passes in the opposite direction along the other side of the divider 71, and exits through the exhaust openings 61. The exhausted air may be vented to atmosphere through the same vents 70 in the housing 42 as the exhausted reactant air.

A gasket (not shown) having openings matching those in the barrier 55 may optionally be placed between the barrier 55 and the cells 65 to prevent leakage of air as it passes into or out of the cell.

The case of the metal-air battery cell 65 defines an electrolyte compartment 74 between the air cathode 73 and the bottom 69. An anode 76 is located in the lower portion of the compartment 74. A cell that can be adapted for use with the air manager system of the present invention is described in U.S. Pat. No. 4,957,826, which is incorporated herein by reference in its entirety.

A detailed view of the construction of the barrier 55 is shown in FIG. 4. The barrier includes two spaced apart outer plates 80 and 81, both of which include identical, aligned passageways 57, 58, 60 and 61 as described above. A baffle 82 is slidably positioned between the plates 80 and 81. The baffle 82, shown in plan view in FIG. 7, includes a plurality of baffle openings 84 and 85 positioned so that all of the openings 57, 58, 60 and 61 are unobstructed when the baffle is in its open position, as shown in FIG. 4. When the baffle is moved to the left, as viewed in FIG. 4, all of the reactant air passageways 57 and 58 are blocked off so that no fresh air can enter the reactant air plenum 67 from the duct 51 or back through the exhaust openings 58. However, the baffle openings 85 preferably leave the cooling air passageways 60 and 61 are open at all times, even when the fan 20 is off.

The baffle 82 is operated manually by means of a switch 86 located behind the barrier 55 at one end thereof. The switch 86 includes an actuator head 87 slidably mounted in a slide mounting block 92, which may be formed as an integral part of the housing 42, as shown in FIG. 5. The actuator head 87 is attached to a neck 88 which slides along a slot 93 in the block 92. A switch arm 89 extends from the neck 88 out the side of the block 92. The actuator head 87 also defines an actuator finger 90, which extends through an opening 98 in the barrier plate 80 into a socket 99 in the baffle, and a notch 95 in the side of the head 87 opposite the finger 90. The notch 95 is positioned to receive the lever of a power switch 96 which is in its "on" position when the baffle 82 is in the position shown in FIG. 4. The power switch 96 is connected to the fan 50 and to the load, such as a computer, by conventional circuitry (not shown). When the arm 89 is grasped and pulled out into the position shown in FIG. 4, the finger 90 moves the baffle 82 such that the air inlets and exhaust openings are opened at the same time as the power switch 96 is turned on, allowing the fan 50 and the load to draw power from the cells 65. Initial operation of the fan may be started using residual power of the cells 65, as described in U.S. Pat. No. 4,913,983, which is incorporated herein be reference in its entirety. Alternately, the fan may be started using an inexpensive auxiliary cell (not shown) mounted in the housing 42. When the arm 89 is pushed toward the mounting block 92, the cells are cut off from the fan and load by the switch 96, and the reactant air plenum 67 is isolated to prevent unnecessary discharge of the cells 65.

The reactant air inlets 57 are sized to permit a desired flow of air through each reactant air plenum 67, and the desired flow will vary depending on the size, voltage and chemistry of the particular cells being used. The flow may be controlled to provide an air flow as described in U.S. Pat. No. 4,221,644, which is incorporated herein by reference in its entirety.

Operation of the air manager system of FIGS. 3 through 7 will be apparent from the foregoing description. A battery of eight fresh cells 65 may be placed into the compartment 44 with the open ends of the cells 65 pressed against the barrier 55. The lower housing 42 may then be attached to the electronic device to be powered by the battery, and electrical connections (not shown) made to the switch 96. When the switch arm 89 is pulled outwardly, the baffle 82 slides to open air inlets 57 to the reactant air plenums 67 of the cells 65 and the fan is turned on. Air is moved from the duct 51 through the barrier 55 to provide oxygen to the air cathodes 73, and power is generated by the metal-air cells 65 in a well-known manner. To terminate discharge of the cells, the switch arm 89 is pushed inwardly until the baffle closes off the reactant air passageways and the power switch 96 is turned off.

Thus, it will be understood that the air manager system 40 separates the reactant air from the cooling air, thereby making it possible to provide higher cooling air flow while limiting the reactant air flow to a level at which the cells will not dry out.

FIGS. 8 and 9 show an alternative manner in which to define a reactant air chamber and separate cooling channels in a single molded cathode air duct 114. The integral molding 114 defines in its top portion a plurality of alternating raised spacers 115 and cooling air channels 116 therebetween. The duct 114 may be positioned to form a hood over the air cathode of a cell body 13 as shown in FIGS. 1 and 2. The reactant air flow enters and exits through openings 129 along the ends of the duct 114. The raised spacers 115 function in the same way as the separate spacers shown in FIGS. 1 and 2, to direct air which cools the anode area of a cell resting on the spacers 115. For convenience, a duct 114 may also be placed on the floor of the battery housing to define the lowermost cooling channels, as shown in FIG. 9.

When excess heat builds up in the cathode air chamber under the duct 114, such heat can be removed via heat exchange to the cooling air channels 116. This can be facilitated by forming the duct 114 from a thin heat-conductive plastic or metal. Control over the oxygen passing over the air cathode is still maintained because there is no mixing of the cathode air flow with the cooling air flow.

FIGS. 10 and 11 show another embodiment of a metal-air cell casing 120 including a heat-exchanging air channel frame assembly 122. FIG. 10 shows an exploded view of the components of the assembled cell 120 shown in FIG. 11. The frame assembly 122 includes four rails attached to form a rectangular frame, two parallel cooling channel rails 124, and two parallel reactant air channel rails 125. Each of the rails 124 and 125 defines an inwardly extending ledge 127. A thin heat-exchanging barrier sheet 130 rests on the ledges 127 at a position about midway between the top and bottom surfaces of the rails 124 and 125.

A pair of load-bearing spacers 131 extend along the top surface of the sheet 130. Opposite ends of the spacers 131 engage the cooling air channel rails 124. Similarly, another pair of spacers 132 extend along the bottom surface of the sheet 130 perpendicular to the spacers 131, and engage the reactant air channel rails 125.

Each of the cooling channel rails 124 defines a plurality of upward projections 135 separated by cooling air cut-outs 136. The next higher cell in a stack will rest on the projections 135 and the spacers 131. The openings 136 are located between the spacers 131 and extend no farther than the barrier 130 so that cooling air may be directed in through the openings 136 in one rail 124, across the barrier sheet 130 between the barrier sheet and the cell immediately above, and out through the opening 136 in the opposite rail 124.

Similarly, each of the reactant air channel rails 125 defines a plurality of downward projections 138 separated by cooling air cut-outs 139. The openings 139 are located between the spacers 132 and extend no farther than the barrier 130 so that cooling air may be directed in through the openings 139 in one rail 125, below the barrier sheet 130 between the barrier sheet and the air cathode immediately below, and out through the opening 139 in the opposite rail 125. The barrier permits efficient heat exchange between the reactant air passing below the barrier through the reactant air openings 139, and the cooling air passing above the barrier through the cooling air channel openings 136.

As shown in FIG. 11, a cell body 13 is equipped with a pair of L-shaped screen members 140 extending upwardly from opposite sides of the cell body and inwardly for a short distance above the air cathode. The screen members 140 thus form a channel for slidably receiving the assembled air channel frame 122, with the projections 138 and the spacers 132 adjacent to the air cathode of the cell. The screen openings allow sufficient reactant air to pass through the openings 139, and if desired, may be sized to restrict and control the amount of reactant air flow. The screen members may be made of a woven screening material or any appropriate perforated sheet material.

It should be understood that cells of the type shown in FIGS. 10 and 11 can be used with fans and air doors as shown in FIG. 1, or with recirculation systems to be described in connection with FIGS. 12 and 13.

FIGS. 12 and 13 show another embodiment of the present invention in which an air manager system 150 provides uniformity of air flow over the cathode by recirculating air over the cathode. As noted above, uniformity of air flow can become a problem at relatively high current levels per area of cathode. To provide recirculation for a stack of cells of the type shown in FIGS. 1 and 2, an inlet plenum 152 is positioned to direct air to all of the cathode chambers 14 in the stack. On the other side of the stack, an outlet plenum 153 collects the air that has passed through all the chambers 14. A connecting duct 155 collects air from the outlet duct 153 and returns it to the inlet duct 152 by means of a recirculation fan 156 located in the duct 155.

The amount of reactant air may be regulated in response to power demand and to accommodate different needs during discharging and recharging. The amount of oxygen available to the cathodes can be varied by varying the recirculating rate of the fan 156, which may recirculate the reactant air at many times the flow rate required by the average oxygen demand of the battery. Furthermore, new air can be admitted to the recirculation system in a controlled manner through a one-way air inlet valve 158 in the duct 155 between the outlet plenum 153 and the fan 156. The valve can be operated in response to pressure differentials in the duct 155. An excess air relief valve 159 is located in the duct 155 downstream of the fan. The valve 159 also can be pressure-responsive, and can be designed to release air in quantities sufficient to balance the new air received through the valve 158. It should be understood that the functions of the valves 158 and 159 can also be performed by air doors of the type described in connection with previous embodiments. Fans 160 provide anode region cooling through cooling channels 16 in the manner described above.

In practice, the recirculated reactant air will rapidly rise in temperature at the power levels at which it is needed. Heat exchange between the cooling channels and adjacent cathode air chambers can be provided to cool the reactant air, as previously described. However, a temperature gradient will exist between the ends of the cooling channels. For example, for one foot by two foot surface area cells at 50 amps and 1000 feet per minute air flow through 0.1 inch anode cooling air gaps, a temperature rise of 10° F. is typical. This gradient will be transposed on the recirculating reactant air flow in the adjacent cathode air chambers, so care must be taken to mix the cathode air on each pass.

FIG. 13 shows a cross mixing system 162 in which the recirculation flow is cross coupled between two stacks of cells 164 and 165. The transverse cooling channels (not shown) of the two stacks are interconnected so that cooling air from cooling fans 166 passes through both stacks. An inlet plenum 167 and an outlet plenum 168 direct the reactant air to and collect the reactant air from the first stack 164, in a manner described above in connection with FIG. 12. Similarly, an inlet plenum 169 and an outlet plenum 170 direct the reactant air to and collect the reactant air from the first stack 165. However, a cross mixing duct 172 transfers the air from the outlet duct 168 to the inlet duct 169 of the second stack 165. A connecting duct 174 containing a reactant air fan 175 directs air from the outlet duct 170 to the inlet duct 167 of the first stack 164.

Thus, reactant air from the first stack 164 that has undergone heat exchange with the cooling air at the "hot" end 177 of the cooling channels is passed into the reactant air chambers of the second stack 165 for heat exchange with cooler air nearer to the cooling air fans 166. This cross mixing has the effect of evening out the temperature of the reactant air throughout the cells in both stacks.

Air quantity control can be effected in the same manner as described in connection with FIG. 12. A fresh air inlet valve 178 is provided in the duct 174 upstream of the arm 175, and an excess air relief valve 179 is located downstream of the fan 175. Furthermore, a hot section 180 of the outlet plenum 168 can be used to provide humidification to the system to make up for the ongoing water loss via the cathode air exhaust. This can be done via evaporation from a moisturized absorber, such as cotton, sponge, or the like, sealed in the plenum 168 of a maintenance free battery. In large batteries, a water source 182 can be rigged to feed a constant supply of water to an absorber, spray system, or other conventional humidification system located in the humidification zone 180.

Many air cathode/electrolyte/anode systems have been developed for metal-air cells. The air management concepts disclosed herein may be applied beneficially to virtually any cell that can be housed in a manner similar to that described above.

It should be understood that the foregoing relates only to a preferred embodiment of the present invention, and that numerous changes may be made therein without departing from the spirt and scope of the invention as defined by the following claims.

What is claimed is:

1. An air manager system for a metal-air battery pack including a pair of metal-air cells each including an air cathode positioned along one side of the cell and an anode positioned adjacent to the opposite side of the cell, comprising:
   means for defining a reactive air plenum adjacent to each of said air cathodes:
   means for directing a reactant air flow through said reactive air plenums;
   means for defining a cooling air passageway adjacent to each of said anodes:
   means for directing a cooling air flow through said cooling air passageways;
   means for positioning said cells with the cathode side of one cell facing the anode side of the other cell; and
   a heat-exchanging material separating said reactive air plenum from said cooling air passageway.

2. An air frame for a metal-air battery pack including a pair of metal-air cells each including an air cathode positioned along one side of the cell and an anode positioned adjacent to the opposite side of the cell, comprising:
   a housing positioned between said cells with the cathode side of one cell adjacent to a first side of said housing and the anode side of the other cell adjacent to a second side of said housing; and
   a heat-exchanging partition dividing said housing into two chambers, a reactant air chamber in communication with the cathode of said one cell, and a cooling air chamber in communication with the anode side of said other cell;
   said chambers each defining entry and exit openings for airflow therethrough.

3. The air frame of claim 2, wherein said housing includes a first pair of frame members supporting opposite edges of said partition and defining a plurality of entry and exit openings on one side of said partition, and a second pair of frame members supporting opposite edges of said partition not supported by said first pair of frame members, and defining a plurality of entry and exit openings on the other side of said partition.

4. The air frame of claim 3, further comprising a plurality of load bearing spacers positioned on both sides of said partition.

5. An air manager system for a metal-air battery pack including a pair of metal-air cells each including an air cathode positioned along one side of the cell and an anode positioned adjacent to the opposite side of the cell, comprising:
   means for defining a cooling air passageway adjacent to each of said anodes;
   means for directing a cooling air flow through said cooling air passageways;
   means for defining a reactive air plenum adjacent to each of said air cathodes;
   means for recirculating a reactant air flow through said reactive air plenums independent of said cooling air flow.

6. The system of claim 5, wherein said battery pack includes two groups of said cells, and wherein said means for recirculating said reactant air flow comprises means for repeatedly in sequence directing said reactant air flow through the reactive air plenums of said first group of cells, and then through the reactive air plenums of said second group of cells.

7. The system of claim 5, further comprising heat exchange means for cooling said recirculating reactant air flow.

8. The system of claim 7, further comprising means for admitting fresh air into said recirculating reactant air flow.

9. The apparatus of claim 8, further comprising means for humidifying said recirculating reactant air flow.

10. An air manager system for a metal-air cell having an air cathode, comprising:
    a housing in which the cell is positioned;
    means for directing a reactant air flow through a reactant air inlet to an air cathode chamber,
    means for exhausting the reactant air flow from the cell;
    means for directing a cooling air flow through a cooling air inlet adjacent to a portion of the cell isolated from the air cathode; and
    means for exhausting the cooling air flow from the housing;
    the reactant air inlet being separate from the cooling air inlet and being isolated from the exhausted cooling air flow.

11. The system of claim 10, wherein the means for directing the reactant and cooling air flows comprise a barrier defining the reactant air inlet and the cooling air inlet.

12. The system of claim 11, wherein the barrier further comprises means for selectively closing and opening the reactant air inlet.

13. The system of claim 11, wherein the means for exhausting the reactant air flow includes at least one reactant air exhaust opening in the barrier through which the reactant air flow passes in leaving the cell, and wherein the means for exhausting the cooling air flow includes at least one cooling air exhaust opening through which the cooling air flow passes in leaving the cell, the exhaust openings being separate from each other and from the inlet openings.

14. The system of claim 13, wherein the barrier further comprises means for selectively closing and opening the reactant air inlet and exhaust openings.

15. The system of claim 14, wherein the means for selectively closing and opening comprises a baffle slidably positioned adjacent to the barrier, the baffle being movable between a first position in which baffle openings defined in the baffle communicate with the reactant air inlet and the reactant air exhaust opening, and a second position in which the baffle blocks the reactant air inlet and the reactant air exhaust opening.

16. The system of claim 15, wherein the baffle further defines baffle cooling openings which communicate with the cooling air inlet and cooling air exhaust opening in both positions of the baffle.

17. The system of claim 16, wherein the means for directing the reactant air and cooling air flows includes a fan and a duct connecting the fan with the reactant air and cooling air inlets of the barrier.

18. An air manager system for a metal-air cell having an air cathode, comprising:

a housing divided into a battery section and a fan section by a barrier, the cell being located in the battery section of the housing adjacent to the barrier;

at least one reactant air inlet defined in the barrier and positioned to communicate with a reactant air plenum adjacent to the air cathode;

at least one reactant air exhaust opening defined in the barrier and positioned to communicate with the reactant air plenum;

at least one cooling air inlet defined in the barrier and positioned to communicate with a cooling air channel adjacent to a portion of the cell isolated from the air cathode;

at least one cooling air exhaust opening defined in the barrier and positioned to communicate with the cooling air channel;

the reactant air inlet and exhaust opening and the cooling air inlet and exhaust opening each being a separate passageway through the barrier;

a duct positioned in the fan section of the housing and joining the barrier at one end of the duct so as to surround the reactant air and cooling air inlets and to isolate such inlets from the reactant air and cooling air exhaust openings; and a fan positioned to direct air from outside the housing along the duct toward the barrier, through the inlets and out of the respective exhaust openings.

19. The air manager system of claim 18, further comprising means for selectively opening and closing the reactant air inlet and reactant air exhaust opening.

* * * * *